US008857188B2

(12) United States Patent
Noda et al.

(10) Patent No.: US 8,857,188 B2
(45) Date of Patent: Oct. 14, 2014

(54) HYBRID DRIVE DEVICE

(75) Inventors: Kazuyuki Noda, Handa (JP); Masashi Kito, Anjo (JP); Yuichi Seki, Okazaki (JP); Satoru Kasuya, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 175 days.

(21) Appl. No.: 13/409,659

(22) Filed: Mar. 1, 2012

(65) Prior Publication Data

US 2012/0247106 A1 Oct. 4, 2012

(30) Foreign Application Priority Data

Mar. 30, 2011 (JP) ................................. 2011-076709

(51) Int. Cl.
| | |
|---|---|
| F02D 25/00 | (2006.01) |
| F16D 31/00 | (2006.01) |
| F16D 33/00 | (2006.01) |
| F16D 37/00 | (2006.01) |
| F16D 39/00 | (2006.01) |
| F16D 31/02 | (2006.01) |
| F02N 11/00 | (2006.01) |
| F02N 15/02 | (2006.01) |
| F01M 1/02 | (2006.01) |
| F01M 9/10 | (2006.01) |
| F01M 11/02 | (2006.01) |
| B60L 15/20 | (2006.01) |
| F16H 57/04 | (2010.01) |
| B60K 6/48 | (2007.10) |

(52) U.S. Cl.
CPC .. *B60K 6/48* (2013.01); *Y02T 90/16* (2013.01); *B60L 15/2054* (2013.01); *F16H 57/0435* (2013.01); *Y02T 10/6221* (2013.01); *B60Y 2306/05* (2013.01); *F16H 57/0484* (2013.01); *F16H 57/0476* (2013.01); *B60W 2520/04* (2013.01)
USPC ............ 60/714; 60/329; 60/456; 123/179.25; 123/179.28; 123/179.29; 123/196 R

(58) Field of Classification Search
USPC ............ 60/329, 456, 714; 903/902, 903, 904, 903/906, 951; 475/5; 123/179.25, 179.28, 123/179.29, 196 R; 310/54; 477/130
See application file for complete search history.

(56) References Cited

U.S. PATENT DOCUMENTS 6,386,170 B1 * 5/2002 Iwano et al. .............. 123/196 R
7,686,112 B2    3/2010 Shiiba
(Continued)

FOREIGN PATENT DOCUMENTS

| JP | A-9-158997 | 6/1997 |
|---|---|---|
| JP | A-2003-42186 | 2/2003 |

(Continued)

OTHER PUBLICATIONS

May 29, 2012 International Search Report issued in International Patent Application No. PCT/JP2012/055037 (with Translation).

(Continued)

*Primary Examiner* — Kenneth Bomberg
*Assistant Examiner* — Daniel Wagnitz
(74) *Attorney, Agent, or Firm* — Oliff PLC

(57) ABSTRACT

A hybrid drive device including an electric motor; an automatic transmission; a lubricating oil passage to which a lubricating oil pressure is supplied; and a switching valve that is switched between a first state where the lubricating oil passage communicates with a first lubricating oil passage that guides lubricating oil to the automatic transmission, and a second state where the lubricating oil passage communicates with a second lubricating oil passage that guides the lubricating oil to the electric motor. The electric motor and an internal combustion engine output shaft are operable in conjunction with the automatic transmission. The switching valve is switched from the first state to the second state when a vehicle is in a stationary state or running at a speed of a predetermined value or less including the stationary state of the vehicle.

7 Claims, 5 Drawing Sheets

(56) References Cited

U.S. PATENT DOCUMENTS

| | | | |
|---|---|---|---|
| 2004/0124722 A1* | 7/2004 | Uchida et al. | 310/54 |
| 2006/0166778 A1* | 7/2006 | Tabata et al. | 475/159 |
| 2007/0111849 A1* | 5/2007 | Ji | 477/6 |
| 2008/0234903 A1* | 9/2008 | Satou | 701/51 |
| 2009/0069146 A1* | 3/2009 | Soga | 476/3 |
| 2009/0321157 A1* | 12/2009 | Sowul et al. | 180/65.22 |
| 2010/0181159 A1* | 7/2010 | Shimizu et al. | 192/85.63 |
| 2010/0186530 A1* | 7/2010 | Tamai et al. | 74/473.11 |
| 2010/0229824 A1* | 9/2010 | Matsuo et al. | 123/196 R |
| 2011/0124459 A1* | 5/2011 | Shimizu et al. | 475/137 |

FOREIGN PATENT DOCUMENTS

| | | | | |
|---|---|---|---|---|
| JP | A-2006-325367 | | 11/2006 | |
| JP | 2007040367 | * | 2/2007 | ............. F16H 61/12 |
| JP | A-2007-085397 | | 4/2007 | |
| JP | A-2007-170533 | | 7/2007 | |
| JP | A-2007-321828 | | 12/2007 | |
| JP | A-2008-7094 | | 1/2008 | |
| JP | A-2008-24251 | | 2/2008 | |
| JP | A-2009-127719 | | 6/2009 | |
| JP | 2009192034 | * | 8/2009 | ............. F16H 61/00 |
| JP | A-2009-257574 | | 11/2009 | |
| JP | A-2010-143428 | | 7/2010 | |

OTHER PUBLICATIONS

May 29, 2012 International Search Report issued in International Patent Application No. PCT/JP2012/055039 (with Translation).

* cited by examiner

F I G . 1
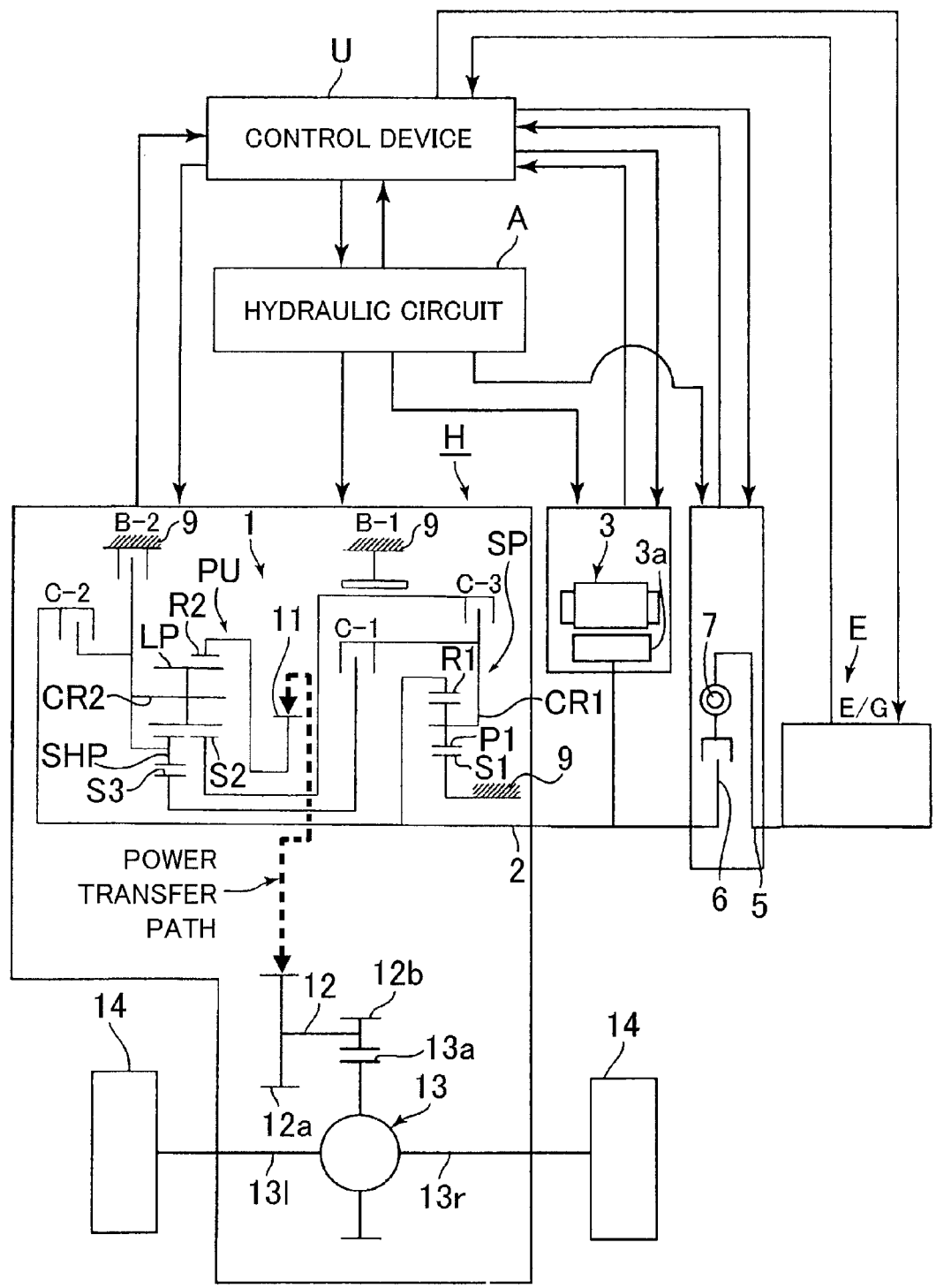

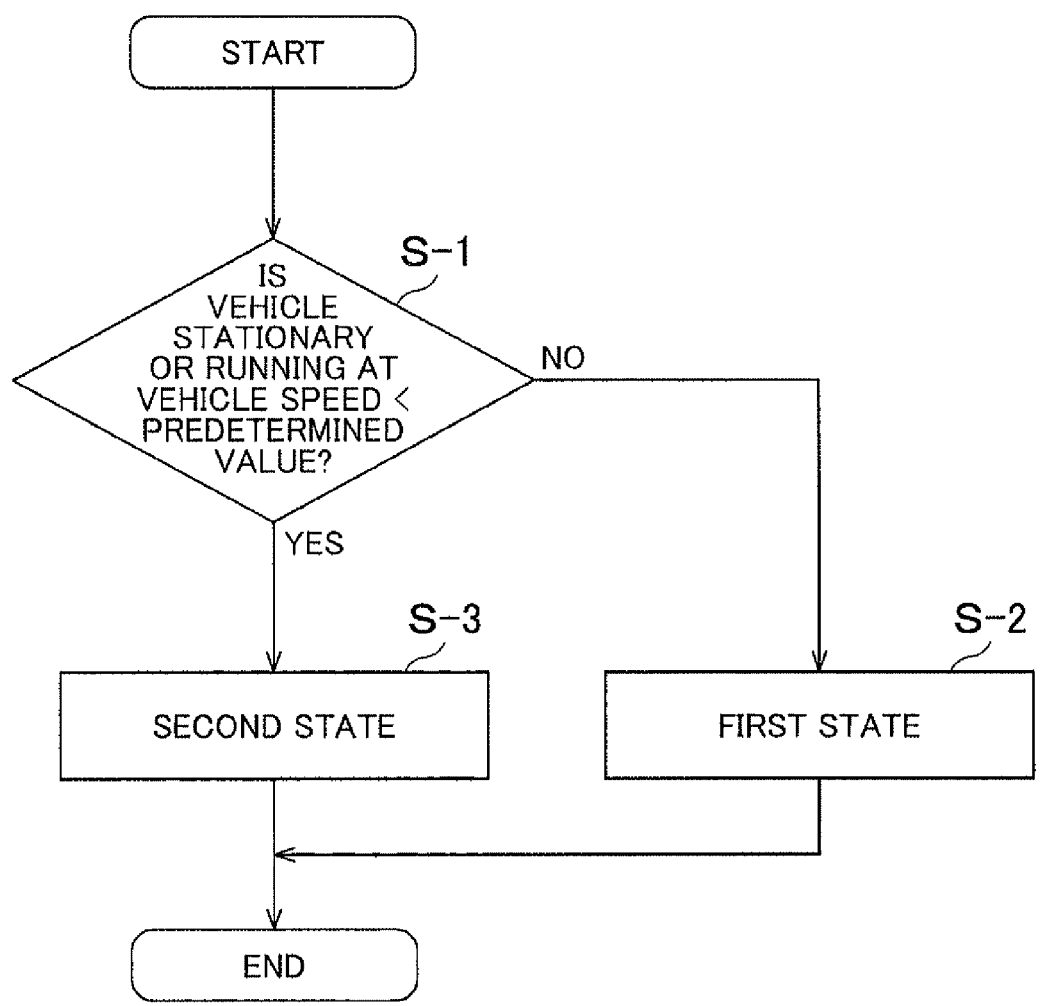

HYBRID DRIVE DEVICE

INCORPORATION BY REFERENCE

The disclosure of Japanese Patent Application No. 2011-076709 filed on Mar. 30, 2011 including the specification, drawings and abstract is incorporated herein by reference in its entirety.

BACKGROUND OF THE INVENTION

The present invention pertains to a hybrid drive device including an internal combustion engine and an electric motor each serving as a drive source, and in particular relates to a lubricating circuit that cools an electric motor in a one-motor parallel type hybrid drive device in which the electric motor serving as a running drive source starts an engine.

DESCRIPTION OF THE RELATED ART

Hitherto, there has been proposed a cooling/lubricating device for power train devices for a vehicle in which oil in a case housing a plurality of power train devices such as a generator, a gear train for shifting, and a motor is drawn up by an oil pump to guide the oil to a supply oil passage via a cooling device, and in which the supply oil passage is branched to extend via respective valves to locations above the power train devices, so that the cooled oil drops down to each of the power train devices (Japanese Patent Application Publication No. 2007-85397 (JP 2007-85397 A)).

In the cooling/lubricating device, the oil pump and the valves are controlled by an electronic control device. For example, in the case where it is determined that outputs of the generator and the motor are large, the amount of oil drawn up by the oil pump is increased compared to a normal value. In the case where it is determined that the motor output or the generator output is large, meanwhile, the opening of the valve for the gear train for shifting is narrowed to supply a minimum required amount of oil to the gear train for shifting, and the valve leading to whichever of the motor and the generator is making a large output is opened to increase the amount of oil supplied to the motor or the generator.

SUMMARY OF THE INVENTION

In the cooling/lubricating device for a hybrid drive device described in No. 2007-85397 (JP 2007-85397 A) mentioned above, in the case where an output of the motor or the generator becomes larger to generate a larger amount of heat, the oil pump or the valves are controlled so as to preferentially supply oil to the motor or the generator to effectively cool the motor or the generator.

However, the cooling/lubricating device requires the dedicated supply passage which is branched to supply oil to each of the power train devices, and requires the valves for controlling the amount of oil supplied to each of the power train devices. Further, each of the valves is formed by an electronic control valve, the opening of which is adjusted by the electronic control device. These factors make the cooling/lubricating device large, elaborated and expensive.

In the one-motor parallel type hybrid drive device, meanwhile, when the electric motor starts the vehicle and further starts the internal combustion engine while running at a low speed using a first speed, and when the internal combustion engine drives the electric motor to generate electricity while the vehicle is stationary or running at an extremely low speed, the electric motor tends to become hot, and it is desired to positively cool the electric motor. In the one-motor parallel type hybrid drive device, in particular, it is necessary to provide the electric motor besides the internal combustion engine and an automatic transmission. This leaves little installation space in the vehicle, and it is desired to adapt to a hybrid system without significantly changing the design of a drive device including the internal combustion engine and the automatic transmission. Thus, it is difficult to apply the large and elaborated cooling/lubricating device described in No. 2007-85397 (JP 2007-85397 A) mentioned above to the one-motor parallel type hybrid drive device from the viewpoint of installation space and cost.

It is therefore an object of the present invention to provide a hybrid drive device that addresses the foregoing issues, in which lubricating oil is positively supplied to an electric motor in the case where it is not necessary to supply a large amount of oil to a gear train when a vehicle is stationary or in a low-speed state at a predetermined vehicle speed or less, with a relatively simple device.

According to a first aspect of the present invention, when a vehicle is running normally, a switching valve is switched to provide communication with a first lubricating oil passage so that lubricating oil is supplied to an automatic transmission to sufficiently lubricate the automatic transmission which is rotating. When the vehicle is stationary or running at a low speed of a predetermined value or less, however, the switching valve is switched to provide communication with a second lubricating oil passage so that lubricating oil is supplied to an electric motor to cool the electric motor, for example in preparation for the next time to start the vehicle, to start an engine, and so forth. In the case where the remaining battery capacity is low and the internal combustion engine drives the electric motor to charge a battery, in addition, lubricating oil is supplied to the electric motor to prevent the electric motor from being overheated. This allows lubricating oil to be utilized effectively with a simple configuration in which the switching valve is added, in particular in the case where the vehicle is stationary and the total supply amount of lubricating oil is small.

According to a second aspect of the present invention, when the electric motor starts the internal combustion engine, or when the electric motor is driven by the internal combustion engine to charge a battery, with a first speed established in the automatic transmission and with the vehicle running at a low speed of a predetermined value or less, a predetermined friction element of the automatic transmission is subjected to slip control so as to absorb variations in difference in rotation between input and output portions. When a predetermined pressure is supplied to a hydraulic servo for the predetermined friction element, however, a second switching valve is switched to a communicated state to directly supply lubricating oil in the second lubricating oil passage to the predetermined friction element via a branched lubricating oil passage so that a sufficient amount of lubricating oil is supplied to the predetermined friction element which is subjected to slip control. In this event, the first switching valve supplies lubricating oil to the second lubricating oil passage so that lubricating oil is also supplied to the electric motor which is subjected to a load for starting the engine or a load for charging the battery in addition to a load for driving the vehicle. This makes it possible to control the output of the electric motor with high accuracy, to perform slip control on the predetermined friction element with high accuracy so as to output smooth torque with little engine starting shock to the output portion of the automatic transmission, and to secure the durability of and the cooling performance for the electric motor and the predetermined friction element, when the electric motor starts the engine.

According to a third aspect of the present invention, even in the case where the switching valve is switched to provide communication with the first lubricating oil passage to supply lubricating oil to the automatic transmission, a part of lubricating oil is supplied to the electric motor via a communication lubricating oil passage and a one-way valve to cool the electric motor which is rotating under no load or a low load.

According to a fourth aspect of the present invention, oil cooled by way of an oil cooler is supplied to the automatic transmission and supplied to the electric motor via the communication lubricating oil passage including the one-way valve to effectively cool the automatic transmission and the electric motor.

According to a fifth aspect of the present invention, the present invention is applied to a one-motor parallel type hybrid drive device in which a clutch is interposed between an input portion and an engine output shaft. Thus, a hybrid drive device with high efficiency and high fuel economy performance can be provided by improving a hydraulic circuit in a relatively simple way without significantly increasing the cost or adding an installation space.

BRIEF DESCRIPTION OF THE DRAWINGS

FIG. 1 is a skeleton diagram showing a hybrid drive device according to the present invention;

FIG. 5 is a flowchart for a lubricating device according to the present invention.

DETAILED DESCRIPTION OF THE EMBODIMENT

Figures 2A, 2B:
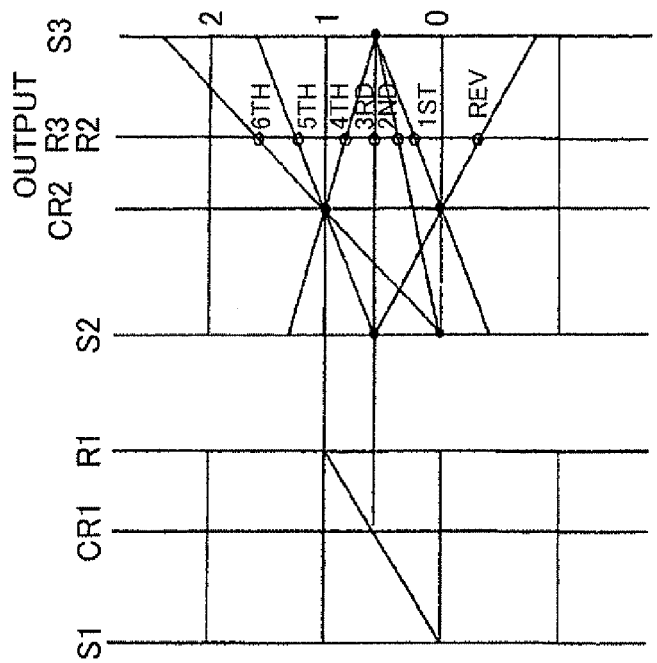
FIG. 2A is an engagement table for an automatic transmission of the hybrid drive device.
FIG. 2B is a velocity diagram for the automatic transmission.

An embodiment of the present invention will be described below with reference to the drawings. As shown in FIG. 1, a hybrid drive device H is a so-called one-motor parallel type hybrid drive device, which includes an internal combustion engine E and an electric motor 3 each serving as a drive source and in which power from the drive sources is transferred via an automatic transmission 1 to an output portion 11 connected to drive wheels 14. A rotor 3a of the electric motor 3 is coupled to an input portion 2 (hereinafter referred to as the "input shaft 2") of the automatic transmission 1. A clutch 6 and a torsion damper 7 are interposed between the input shaft 2 and an engine output shaft 5. The electric motor 3 functions as a drive source for the vehicle, as a starter (starter motor) for driving the engine, and further as an alternator (generator) that converts engine power or an inertial force of the vehicle into electric energy. While the clutch 6 and the torsion damper 7 are disposed between the input shaft 2 and the engine output shaft 5, the clutch 6 and the torsion damper 7 may be replaced with a torque converter with a lock-up clutch. In this case, the lock-up clutch serves as the function of the clutch 6. While the automatic transmission 1 is formed as a multi-speed automatic transmission that establishes one of a multiplicity of shift speeds by changing a power transfer path using a multiplicity of friction elements, the automatic transmission 1 may be formed as a continuously variable automatic transmission of a belt type, a cone ring type, a toroidal type, or the like.

The input shaft 2 of the automatic transmission 1 is disposed coaxially with the electric motor 3, the clutch 6, and the engine output shaft 5. A planetary gear SP and a planetary gear unit PU are provided on the input shaft 2. The planetary gear SP is a so-called single-pinion planetary gear, which includes a sun gear S1, a carrier CR1, and a ring gear R1 and in which the carrier CR1 includes a pinion P1 meshed with the sun gear S1 and the ring gear R1.

The planetary gear unit PU is a so-called Ravigneaux type planetary gear, which includes four rotary elements, namely a sun gear S2, a sun gear S3, a carrier CR2, and a ring gear R2 and in which the carrier CR2 includes a long pinion LP meshed with the sun gear S2 and the ring gear R2 and a short pinion SHP meshed with the sun gear S3 in such a manner that the long pinion LP and the short pinion SHP are meshed with each other.

The sun gear S1 of the planetary gear SP is connected to a boss (not shown) integrally fixed to a transmission case 9, which is a fixed member, so as not to be rotatable. The ring gear R1 makes the same rotation (hereinafter referred to as "input rotation") as rotation of the input shaft 2. Further, the carrier CR1 rotates at a speed that is reduced from the speed of the input rotation by the sun gear S1 which is fixed and the carrier CR1 which makes the input rotation. The carrier CR1 is connected to a clutch C-1 and a clutch C-3.

The sun gear S2 of the planetary gear unit PU is connected to a brake B-1 so as to be selectively fixed with respect to the transmission case 9. The sun gear S2 is also connected to the clutch C-3 so as to selectively receive reduced-speed rotation of the carrier CR1 via the clutch C-3. The sun gear S3 is connected to the clutch C-1 so as to selectively receive reduced-speed rotation of the carrier CR1.

Further, the carrier CR2 is connected to a clutch C-2 that receives rotation of the input shaft 2 so as to selectively receive the input rotation via the clutch C-2. The carrier CR2 is also connected to a brake (predetermined friction element) B-2 such that rotation of the carrier CR2 can be selectively stopped via the brake B-2. The ring gear R2 is connected to a counter gear 11 serving as the output portion. The counter gear 11 is meshed with a counter driven gear 12a on a counter shaft 12. Further, rotation of the counter shaft 12 is transferred to a differential device 13 via a pinion gear 12b and a differential mount gear 13a to be transferred to the drive wheels 14, 14 via left and right axles 131, 13r.

The hybrid drive device H further includes a hydraulic circuit A and a control device U. The hydraulic circuit A communicates with to-be-lubricated portions of the automatic transmission 1 and the electric motor 3. The control device U is electrically connected to the automatic transmission 1, the electric motor 3, the internal combustion engine E, and the hydraulic circuit A in input and output directions.

In the automatic transmission 1 configured as described above, the clutches C-1 to C-3 and the brakes B-1 and B-2 shown in the skeleton diagram of FIG. 1 are engaged and disengaged in combinations shown in the engagement table of FIG. 2A to establish one of a first forward speed (1st) to a sixth forward speed (6th) and a first reverse speed (Rev) as shown in the velocity diagram of FIG. 2B.

The brake B-2 is a brake actuated to establish the first speed and the reverse speed, and engaged when starting the vehicle and subjected to slip control when the electric motor 3 starts the engine. That is, the vehicle is brought into a first-speed state by engaging the clutch C-1 and engaging the brake B-2. In the first-speed state, rotation of the input shaft 2 is transferred to the sun gear S3 of the planetary gear PU with the speed of the rotation reduced through engagement of the clutch C-1, and further reduced in speed to be output from the ring gear R2 to the counter gear 11 with the carrier CR2 made stationary by the brake B-2. When starting the vehicle using the first speed, normally, the clutch 6 is disengaged, and the engine is stationary and to be driven by the electric motor 3.

Then, the engine E is started in the first-speed state after the vehicle is started. When the vehicle is running at a low speed using the first speed, the electric motor 3 is occasionally rotated by an output of the internal combustion engine E to charge a battery. In this event, with the brake B-2 subjected to slip control to absorb the difference in rotation between the input shaft and an output shaft of the automatic transmission 1, torque of the electric motor 3 is increased and the clutch is engaged to rotate the internal combustion engine E.

Figure 3:
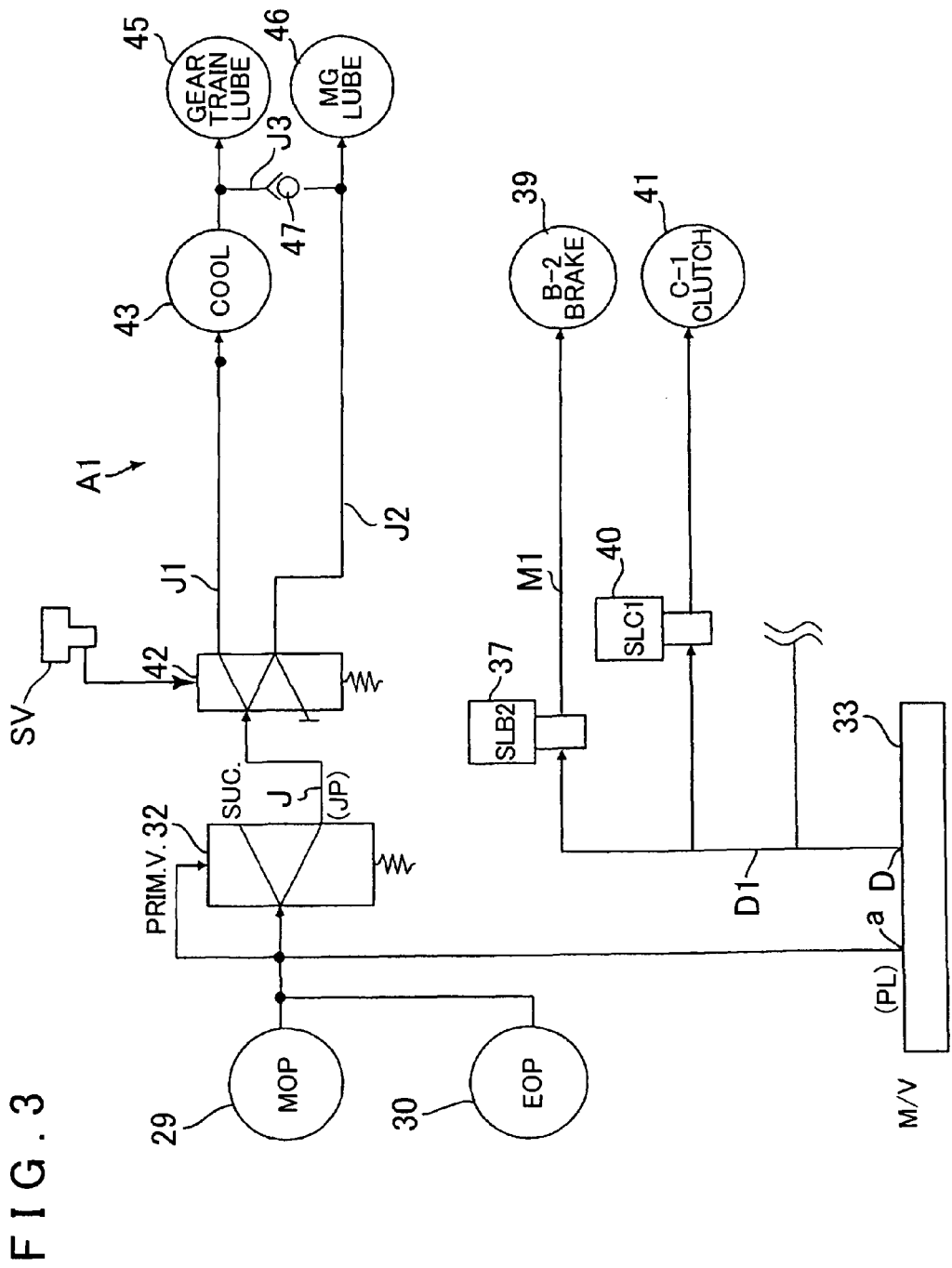
FIG. 3 shows a hydraulic circuit according to a first embodiment of the present invention.

As shown in FIG. 3, a hydraulic circuit A1 according to a first embodiment includes a mechanical oil pump 29 and an electric oil pump 30 driven in conjunction with the input shaft 2 of the automatic transmission 1 (or the engine output shaft). The hydraulic pressure generated by these pumps is regulated to a line pressure PL by a primary regulator valve controlled in accordance with an electric signal from a controller. Further, a secondary regulator valve 32 also controlled in accordance with an electric signal from the control device (controller) U is disposed on the discharge side of the primary regulator valve to regulate the hydraulic pressure to a lubricating oil pressure JP. The line pressure PL from the primary regulator valve is led to a manual valve 33. The manual valve 33 is switched by an operation for switching between ranges (P, R, N, D, and so forth) performed by a driver. An operation for selecting the D range provides communication between a line pressure supply port a and a D-range line pressure port D to supply the line pressure (PL) to an oil passage D1. The line pressure is supplied to a hydraulic servo 39 for the brake B-2 via a linear solenoid valve (SLB2) 37, and supplied to a hydraulic servo 41 for the clutch C-1 via a linear solenoid valve (SLC1) 40. The line pressure PL is supplied not only to the hydraulic servo 39 for the brake B-2, which serves as the predetermined friction element to be engaged for establishment of the first speed, and the hydraulic servo 41 for the clutch C-1 but also to hydraulic servos for other friction elements. The hydraulic circuit A1 may be provided with only one of the mechanical oil pump 29 and the electric oil pump 30.

A switching valve 42 is provided in an oil passage J to which the lubricating oil pressure JP is supplied from the secondary regulator valve 32. The switching valve 42 is switched by a solenoid valve SV that is controlled so as to be turned on and off on the basis of a signal from the control device U so as to switch the oil passage J between communication with a first lubricating oil passage J1 and communication with a second lubricating oil passage J2. The first lubricating oil passage J1 leads to a to-be-lubricated portion 45 of the gear trains (SP, PU) of the automatic transmission 1 via an oil cooler 43. The second lubricating oil passage J2 leads to a to-be-lubricated/cooled portion 46 of the electric motor 3 such as a stator winding. A communication lubricating oil passage J3 provides communication between a portion of the first lubricating oil passage J1 between the oil cooler 43 and the to-be-lubricated portion 45 of the gear trains and the second lubricating oil passage J2 leading to the to-be-lubricated/cooled portion 46 of the electric motor. The communication lubricating oil passage J3 includes a one-way valve 47 that allows oil to flow from the first lubricating oil passage J1 to the second lubricating oil passage J2.

The solenoid valve SV which controls the switching valve 42 is switched in accordance with a signal from the control device U as shown in FIG. 5. That is, it is determined whether or not the vehicle is in a stationary state or running (extremely) slowly at a vehicle speed less than a predetermined speed including the stationary state (S-1). If it is detected that the vehicle speed is a predetermined value or more, that is, the vehicle is not stationary or the vehicle speed is not less than the predetermined value (NO), the switching valve 42 is switched into a first state allowing communication with the first lubricating oil passage J1 (S-2). If it is detected that the vehicle is stationary or the vehicle speed is less than the predetermined value (YES), the switching valve 42 is switched into a second state allowing communication with the second lubricating oil passage J2 (S-3). The signal for switching the switching valve 42 may be a signal indicating a stationary state of the vehicle, a signal indicating detection of a predetermined vehicle speed or less (including the stationary state), or a signal hydraulic pressure that may discriminate the stationary state of the vehicle (or the predetermined speed or less) (for example, a hydraulic pressure corresponding to a non-operating state of the clutch C-1). In the one-motor parallel type hybrid drive device H, the electric motor 3 is driven when starting the vehicle at a low speed or when electricity is generated/charged with the vehicle stationary. Thus, a drive signal for the electric motor may be added to the signal indicating a stationary state of the vehicle. The switching valve 42 is not limited to a valve switched by a solenoid valve switched in accordance with an electric signal, and may be a valve switched in accordance with a hydraulic pressure.

According to the configuration described above, when the vehicle is stationary, the mechanical oil pump 29 is stopped, which reduces the amount of oil supplied to the entire hybrid drive device H. Meanwhile, the automatic transmission 1 is stationary, and therefore does not require lubricating oil. When the vehicle is stationary, the switching valve 42 has been switched to provide communication between the oil passage J on the supply side and the second lubricating oil passage J2 so that substantially all of the relatively small amount of lubricating oil is supplied to the to-be-lubricated/cooled portion 46 of the electric motor. When the vehicle is stationary, the electric motor 3 is sufficiently cooled by lubricating oil (oil) from the second lubricating oil passage J2 in preparation for the next time to start the vehicle. Then, when starting the vehicle, torque from the electric motor 3 is transferred via the automatic transmission 1, in the first-speed state to the output portion 11 and then to the drive wheels 14 to drive the vehicle. With the first speed established in the automatic transmission 1, the linear solenoid valves 37 and 40 supply a predetermined hydraulic pressure is supplied to the hydraulic servos 39 and 41 to engage the brake B-2 and the clutch C-1, respectively.

When the clutch 6 is engaged with the first speed established, torque of the electric motor 3 is transferred to the internal combustion engine E via the clutch 6 to start the engine. In this event, the pressure for the linear solenoid valve 37 is regulated to perform slip control on the brake B-2 to absorb the difference in rotation between the input and output shafts of the automatic transmission 1. In addition, output torque of the electric motor 3 is controlled to output smooth torque with little starting shock to the output portion 11. In this state, the signal indicating a stationary state has been cancelled. Thus, the switching valve 42 is switched to connect the lubricating oil passage J on the supply side to the first lubricating oil passage J1. This allows the lubricating oil pressure JP to be supplied to the to-be-lubricated portion 45 of the gear trains via the oil cooler 43 so that lubricating oil is supplied to the automatic transmission 1. When starting the engine, in particular, it is desirable to supply a relatively large amount of lubricating oil to the brake B-2 in order to perform slip control on the brake B-2. However, lubricating oil is supplied from the first lubricating oil passage J1 to make it possible to perform adequate slip control and maintain the durability of the brake B-2.

When starting the engine, a load for starting the engine is applied to the electric motor 3 in addition to a load for driving the vehicle (including an inertial load). However, such a load is applied within a relatively short period from the time when the vehicle is stationary, during which the electric motor 3 is positively cooled, so that the electric motor 3 will not be overheated. Then, after the engine is started, the electric motor 3 rotates under no load, outputs predetermined torque to assist engine power, or performs regeneration using the inertia of the vehicle. However, oil cooled by the oil cooler 43 is supplied from the first lubricating oil passage J1 via the one-way valve 47 in the communication lubricating oil passage J3 to cool the electric motor 3, which is rotating under no load or a low load. This prevents the motor from being overheated.

In the case where the remaining capacity (SOC) of the battery is reduced with the vehicle stationary (in the P range or N range), the clutch 6 is engaged to transfer power of the internal combustion engine E to the electric motor 3 via the clutch 6 so that the electric motor (generator) 3 charges the battery. In this event, the switching valve 42 has been switched to communicate the lubricating oil passage J on the supply side with the second lubricating oil passage J2 upon detecting a stationary state of the vehicle so that a sufficient amount of oil is supplied to the to-be-lubricated/cooled portion 46 of the electric motor. This prevents the electric motor 3 from being overheated.

While the above function is described for a case where the switching valve 42 is switched when the vehicle is stationary, the switching valve 42 may be switched to provide communication with the second lubricating oil passage J2 also when the vehicle is running at a low speed of a predetermined speed or less. In this case, lubricating oil is supplied to the to-be-lubricated/cooled portion 46 of the electric motor to sufficiently cool the electric motor also when the vehicle is started by the electric motor and when the engine is started by the electric motor.

Figure 4:
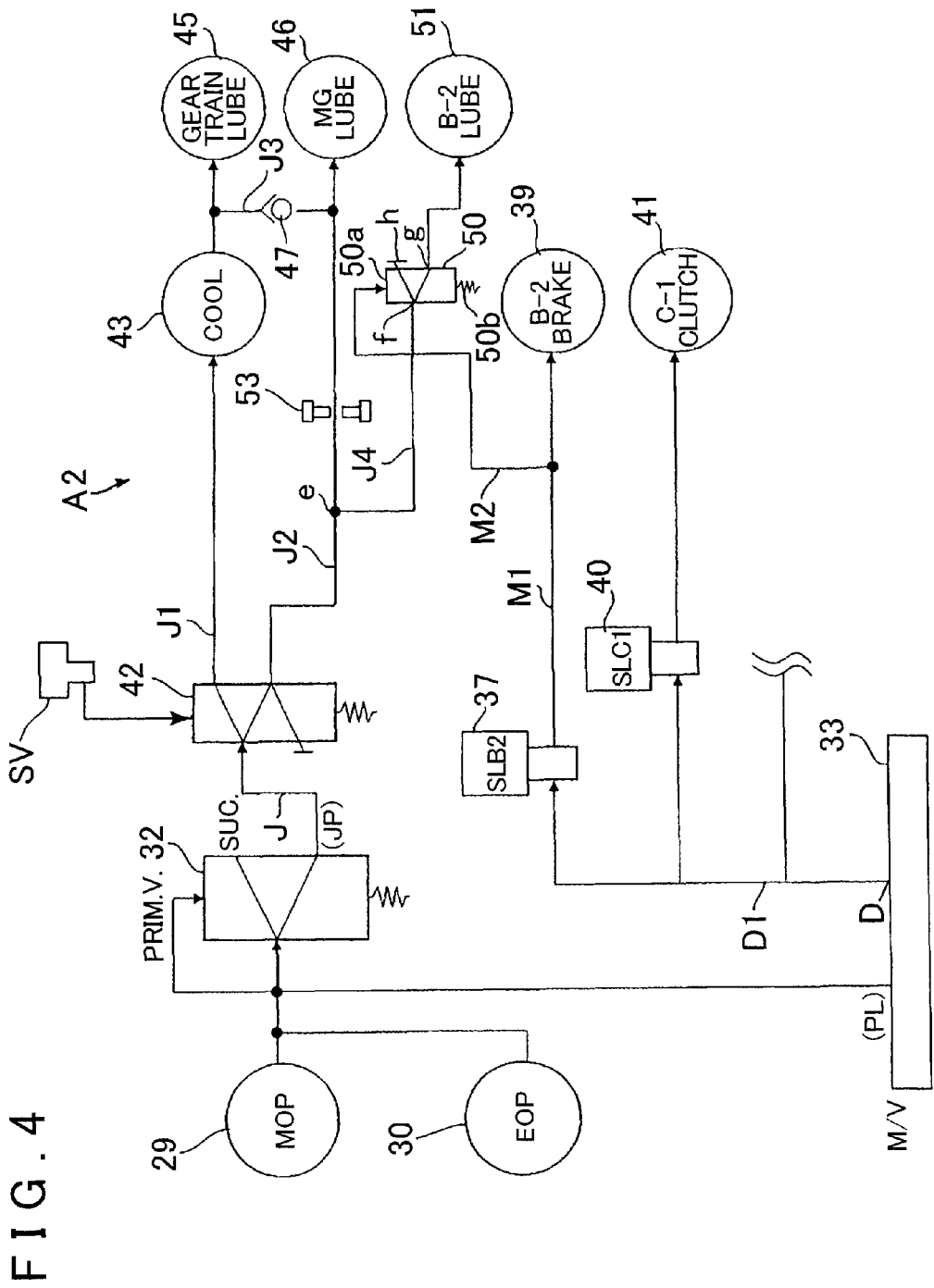
FIG. 4 shows a hydraulic circuit according to a second embodiment of the present invention.

Now, a second embodiment will be described with reference to FIG. 4. Constituent parts similar to those according to the first embodiment shown in FIG. 3 are given the same reference numerals to omit their descriptions. A hydraulic circuit A2 includes a branched lubricating oil passage J4 branched from the second lubricating oil passage J2. The branched lubricating oil passage J4 communicates with a to-be-lubricated portion 51 for the brake B-2 via a second switching valve 50. An orifice 53 is provided between a branched portion e of the second lubricating oil passage J2 and the to-be-lubricated/cooled portion 46 of the electric motor to prevent lubricating oil from the communication lubricating oil passage J3 from flowing in reverse to the branched lubricating oil passage J4.

The second switching valve 50 includes a control oil chamber 50a provided at one end portion of a spool. The control oil chamber 50a communicates with an oil passage M1 leading to the hydraulic servo 39 for the brake B-2 via an oil passage M2. That is, the line pressure is regulated by the linear solenoid valve 37, and the regulated pressure is supplied to the hydraulic servo 39 for the brake B-2 through the regulated pressure oil passage M1, and led to the control oil chamber 50a of the switching valve 50 through the branched regulated pressure oil passage M2. The urging force of a spring 50b acts on the other end of the spool against the control oil chamber 50a. The spool switchably provides communication between a supply port f for the branched lubricating oil passage J4 and one of an output port g for the to-be-lubricated portion 51 for the brake B-2 and a blocked port h.

In the second embodiment, the (first) switching valve 42 is switched to provide communication between the lubricating oil passage J on the supply side and the second lubricating oil passage J2 in a low-speed state in which the vehicle is stationary or running at a vehicle speed of a predetermined value (for example, 15 to 35 km/h) or less. The predetermined value is set in correspondence with the first to second speeds, for example. In addition, the second switching valve 50 is set so that the second switching valve 50 is able to switch from the blocked port h to the output port g when the regulated pressure from the linear solenoid valve 37 is a relatively low pressure corresponding to slip control for the brake B-2. For the to-be-lubricated portion 51 for the second brake B-2, oil may be directly supplied to the brake B-2, which is a multi-plate friction element, through a nozzle or the like.

In the hydraulic circuit A2 according to the second embodiment configured as described above, when the vehicle is stationary, the first switching valve 42 connects the lubricating oil passage J on the supply side to the second lubricating oil passage J2 so that lubricating oil is supplied to the to-be-lubricated/cooled portion 46 of the electric motor to cool the electric motor 3, as in the first embodiment. When the vehicle is running at a vehicle speed of the predetermined value or more, the first switching valve 42 connects the oil passage J on the supply side to the first lubricating oil passage J1 so that a relatively large amount of lubricating oil pumped by the mechanical oil pump 29 is supplied to the to-be-lubricated portion 45 of the gear trains via the oil cooler 43 to cool the gear trains SP and PU, bearings, and so forth of the automatic transmission 1. Further, a part of lubricating oil in the first lubricating oil passage J1 is supplied to the to-be-lubricated/cooled portion 46 of the electric motor via the one-way valve 47 in the communication lubricating oil passage J3 to cool the electric motor 3. In this event, the orifice 53 prevents lubricating oil that passes through the communication lubricating oil passage J3 from flowing in reverse to the branched lubricating oil passage J4.

When starting the vehicle, the first speed is established in the automatic transmission 1 with the brake B-2 and the clutch C-1 engaged, the clutch 6 is disengaged, the internal combustion engine E is stationary, and the vehicle runs with the electric motor 3 serving as a drive source. In this event, the vehicle speed is the predetermined value or less, and the first switching valve 42 is in the state where the lubricating oil pressure JP is supplied to the second lubricating oil passage J2. Consequently, lubricating oil is supplied to the to-be-lubricated/cooled portion 46 of the electric motor, and the lubricating oil pressure JP is supplied to the supply port f of the second switching valve 50 via the branched lubricating oil passage J4.

With the first speed established in the automatic transmission 1, the linear solenoid valve 37 regulates the line pressure to a predetermined pressure to output the predetermined pressure to the regulated pressure oil passage M1, which supplies the predetermined pressure to the hydraulic servo 39 for the brake B-2 to completely engage the brake B-2. The predetermined pressure in the regulated pressure oil passage M1 is supplied to the control oil chamber 50a of the second switching valve 50 via the branched regulated pressure oil passage M2. The switching valve 50 provides communication between the supply port f and the output port g so that lubricating oil in the branched lubricating oil passage J4 is supplied to the to-be-lubricated portion 51 for the brake B-2 through the ports f and g.

When the vehicle is running at a low speed with the first speed established in the automatic transmission 1, the clutch 6 is engaged to transfer torque of the electric motor 3 to the internal combustion engine E to start the engine E. In this event, in general, the electric motor 3 rotates at an engine starting rotational speed that is higher than during running at a low speed. Therefore, it is necessary to absorb the difference in rotation between the input and output shafts of the automatic transmission 1, and the brake B-2 is subjected to slip control. Thus, a relatively large amount of lubricating oil may be supplied to the brake B-2. However, the first and second switching valves 42 and 50 directly supply the brake B-2 with a relatively large amount of lubricating oil, which is obtained by driving the mechanical oil pump 29 in accordance with the rotational state of the automatic transmission 1. This makes it possible to adequately perform slip control with high accuracy, and to secure the durability of the brake B-2.

In this event, the vehicle speed is low at a predetermined value or less, and thus the load for lubricating the gear trains of the automatic transmission 1 is not high. When the engine E is started using torque of the electric motor 3, the electric motor 3 is subjected to a load for starting the engine in addition to a load for driving the vehicle. Through output control for the electric motor 3 combined with slip control for the brake B-2, however, the electric motor 3 outputs smooth torque with little engine starting shock to the output portion 11 of the automatic transmission 1. The electric motor 3 is cooled by lubricating oil in the second lubricating oil passage J2 not to be overheated.

When the vehicle is running at a low speed with the first speed established in the automatic transmission 1, the remaining battery capacity (that is, SOC of the battery) may fall short, and the electric motor 3 may be rotated using power from the internal combustion engine E supplied via the clutch 6 to charge the battery. Also in this case, the internal combustion engine output shaft 5 and the input shaft 2 are rotated at higher speeds than during running at a low speed with the first speed established in the automatic transmission 1, and therefore it is necessary to perform slip control on the brake B-2. In this state, the time for slip control is extended compared to when starting the engine. As discussed above, however, lubricating oil is directly supplied to the brake B-2 via the second lubricating oil passage J2 communicated by the first switching valve 42, the branched lubricating oil passage J4, and the ports f and g of the second switching valve 50 so that a relatively large amount of lubricating oil is supplied all during the slip control. This makes it possible to prevent the brake B-2 from being overheated, and to maintain slip control with high accuracy during the charging period.

After the engine E is started, engine torque is transferred to the automatic transmission 1 via the clutch 6 so that the vehicle runs exclusively using an engine output. In this state, the vehicle speed becomes a predetermined value or more, and the first switching valve 42 is switched to provide communication between the lubricating oil passage J and the first lubricating oil passage J1, or an upshift to the second speed is performed, which releases a predetermined pressure for the hydraulic servo 39 for the brake B-2 and switches the second switching valve 50 to provide communication the branched lubricating oil passage J4 with the blocked port h. Thus, the lubricating oil pressure JP is supplied to the to-be-lubricated portion 45 of the gear trains via the first lubricating oil passage J1, and the direct supply of lubricating oil to the to-be-lubricated portion 51 for the brake B-2 is blocked.

In the case where the vehicle is running at a vehicle speed of the predetermined value or more, power from the internal combustion engine E, which serves as the only power source, is transferred to the drive wheels via the automatic transmission 1 which establishes one of the multiplicity of shift speeds. In this event, the first switching valve 42 connects the lubricating oil passage J on the supply side to the first lubricating oil passage J1, and lubricating oil is supplied to the to-be-lubricated portion 45 of the gear trains to lubricate the automatic transmission 1 in the running state, as described earlier. In the case where the vehicle is mainly driven by the internal combustion engine E to run, the electric motor 3 rotates under no load, outputs predetermined torque to assist engine drive, or performs regeneration using an inertial force of the vehicle to charge the battery. In the case where the remaining capacity (that is, SOC) of the battery becomes low, the internal combustion engine E rotates the electric motor 3 to cause the electric motor to function as a generator to charge the battery. In this state, a part of lubricating oil, which is from the first lubricating oil passage J1 and cooled by the oil cooler, is supplied to the to-be-lubricated/cooled portion 46 of the electric motor via the one-way valve 47 to cool the electric motor 3 which is rotating under no load or a low load. This prevents the motor from being overheated.

When the remaining battery capacity becomes low, in addition, the driver stops the vehicle in the P range (or the N range). In this state, the clutch 6 is engaged to cause the engine E to drive the electric motor 3 to charge the battery. In this event, the first switching valve 42 is switched to provide communication between the lubricating oil passage J on the supply side and the second lubricating oil passage J2 so that lubricating oil is supplied to the to-be-lubricated/cooled portion 46 of the electric motor. This prevents the electric motor 3 from being overheated. Since the hydraulic servo 39 for the brake B-2 is opened, the supply port f of the second switching valve 50 is blocked, and lubricating oil is not directly supplied to the to-be-lubricated portion 51 for the brake B-2.

In the embodiments described above, the present invention is applied to the one-motor parallel type hybrid drive device including the clutch 6. However, the present invention is not limited thereto, and may be applied to a one-motor parallel type hybrid drive device including no clutch and other types of hybrid drive devices such as a hybrid drive device including a power distribution mechanism.

The lubricating circuit according to the present invention is used in a hybrid drive device including an engine and an electric motor each serving as a drive source, and the hybrid drive device is mounted on an automobile to be utilized. While the present invention may be applied to one-motor parallel type hybrid drive devices, in particular hybrid drive devices in which a clutch is interposed between a rotor of an electric motor and an engine output shaft, the present invention may also be applied to other types of hybrid drive devices.

What is claimed is:
1. A hybrid drive device for a vehicle, comprising:
an electric motor;
an internal combustion engine output shaft;
an automatic transmission including:
an input portion, and
an output portion,
the automatic transmission outputting rotation of the input portion to the output portion wherein a speed of rotation changes between the input portion and the output portion;
a lubricating oil passage;

a first lubricating oil passage configured to guide lubricating oil to the automatic transmission to lubricate the automatic transmission;
a second lubricating oil passage configured to guide lubricating oil to the electric motor to lubricate the electric motor;
a lubricating oil pressure is supplied to the lubricating oil passage; and
a switching valve that is switched between:
    a first state, in which the lubricating oil passage communicates with the first lubricating oil passage that guides lubricating oil in the lubricating oil passage to the automatic transmission, and
    a second state, in which the lubricating oil passage communicates with the second lubricating oil passage that guides the lubricating oil in the lubricating oil passage to the electric motor, wherein:
the electric motor and the internal combustion engine output shaft are operable in conjunction with the input portion, and
the switching valve is switched from the first state to the second state in the case where the vehicle is in a stationary state or running at a speed of a predetermined value or less including the stationary state of the vehicle.

2. The hybrid drive device according to claim 1, further comprising:
a to-be-lubricated portion of the automatic transmission, wherein
a communication lubricating oil passage is branched from a portion of the first lubricating oil passage upstream of the to-be-lubricated portion and communicates with the second lubricating oil passage, and
a one-way valve is provided in the communication lubricating oil passage to allow the lubricating oil to flow from the first lubricating oil passage to the second lubricating oil passage.

3. The hybrid drive device according to claim 2, wherein an oil cooler is provided in a portion of the first lubricating oil passage upstream of the portion from which the communication lubricating oil passage is branched.

4. The hybrid drive device according to claim 1, wherein a clutch is interposed between the input portion and the internal combustion engine output shaft, and
the hybrid drive device is formed as a one-motor parallel type hybrid drive device.

5. A hybrid drive device for a vehicle, comprising:
an electric motor;
an internal combustion engine output shaft;
an automatic transmission including:
    an input portion,
    an output portion,
    a power transfer path,
    a plurality of friction elements,
    a predetermined friction element that is included in the plurality of friction elements,
the automatic transmission outputting rotation of the input portion to the output portion wherein a speed of rotation changes between the input portion and the output portion;
a lubricating oil passage;
a first lubricating oil passage configured to guide lubricating oil to the automatic transmission to lubricate the automatic transmission;
a second lubricating oil passage configured to guide lubricating oil to the electric motor to lubricate the electric motor;
a lubricating oil pressure is supplied to the lubricating oil passage;
a first switching valve that is switched between:
    a first state, in which the lubricating oil passage communicates with the first lubricating oil passage that guides lubricating oil in the lubricating oil passage to the automatic transmission, and
    a second state, in which the lubricating oil passage communicates with the second lubricating oil passage that guides the lubricating oil in the lubricating oil passage to the electric motor;
a second switching valve;
a control oil chamber; and
a hydraulic servo, wherein:
the electric motor and the internal combustion engine output shaft are operable in conjunction with the input portion,
the first switching valve is switched from the first state to the second state in the case where the vehicle is running at a speed of a predetermined value or less including a stationary state of the vehicle,
the automatic transmission performs shifting by changing the power transfer path using the plurality of friction elements including the predetermined friction element that is engaged to establish a first speed and that is used for slip control,
a branched lubricating oil passage is branched from the second lubricating oil passage and leads to the predetermined friction element, and the second switching valve is provided in the branched lubricating oil passage to be switched between a blocked state and a communicated state, and
the second switching valve includes the control oil chamber communicating with the hydraulic servo for the predetermined friction element, and in the case where a predetermined pressure is supplied to the hydraulic servo, the second switching valve is switched from the blocked state to the communicated state so that the lubricating oil from the second lubricating oil passage is directly supplied to the predetermined friction element via the branched lubricating oil passage.

6. The hybrid drive device according to claim 5, further comprising:
a to-be-lubricated portion of the automatic transmission, wherein
a communication lubricating oil passage is branched from a portion of the first lubricating oil passage upstream of the to-be-lubricated portion and communicates with the second lubricating oil passage, and
a one-way valve is provided in the communication lubricating oil passage to allow the lubricating oil to flow from the first lubricating oil passage to the second lubricating oil passage.

7. The hybrid drive device according to claim 6, wherein an oil cooler is provided in a portion of the first lubricating oil passage upstream of the portion from which the communication lubricating oil passage is branched.

* * * * *